Aug. 28, 1962    G. BERGSON    3,051,643
MEASURING APPARATUS
Filed March 16, 1959    2 Sheets-Sheet 1

INVENTOR.
GUSTAV BERGSON

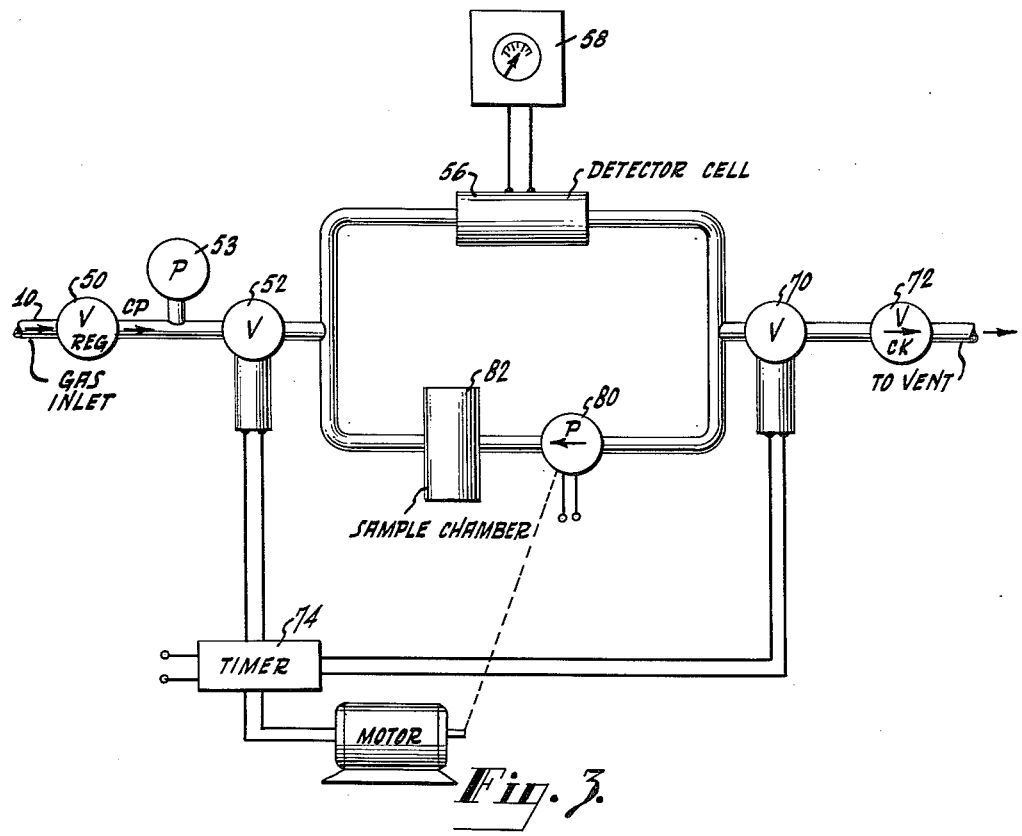

United States Patent Office 3,051,643
Patented Aug. 28, 1962

3,051,643
MEASURING APPARATUS
Gustav Bergson, Jenkintown, Pa.
(250 Titus Ave., Warrington, Pa.)
Filed Mar. 16, 1959, Ser. No. 799,796
6 Claims. (Cl. 204—195)

This invention relates to measuring systems and more particularly to systems for detecting and measuring minute quantities of a constituent component of a gas, such as, for example, the measurement of water vapor content of a gas in parts per million (p.p.m.).

In many industrial operations it is desirable or necessary to determine the amount of a given component present in a gas. By way of example, in refrigerating systems it is necessary to maintain the water vapor present in the refrigerant below a predetermined amount in order to prevent condensation and freezing in the coils of the system. Likewise, in the handling of fuel gases it has been found desirable to maintain the water vapor content below certain levels.

Apparatus has heretofore been developed for detecting and measuring minute quantities of a given component of a gas. For example, apparatus for measuring water vapor in a gas essentially comprises an electrolytic cell through which a gas is passed at a constant rate of flow. Water vapor in the gas is absorbed and electrolyzed in the cell, and the electrolysis current is used as an indication of water content. In order that the electrolysis current be an accurate indication of parts of water per unit volume of gas it is necessary that the flow of the gas through the electrolysis cell be carefully regulated at a known rate. Since the rate of flow through the cell is usually in the order of 100 cc./min., the types of flow controllers used are relatively expensive, and comprise a large portion of the cost of the measuring apparatus.

Accordingly, it is a principal object of this invention to provide an improved measuring apparatus for detecting and measuring minute quantities of a constituent component of a gas.

Another object of this invention is to provide an improved flow controlling system for a measuring system of the type described.

Another object of this invention is to provide an improved water vapor detecting apparatus which can be easily built at lower cost than presently known types of apparatus of equivalent accuracy.

A further object of this invention is to provide a water vapor detecting apparatus of improved sensitivity.

A still further object of this invention is to provide an improved water vapor detecting and measuring instrument wherein the requirements of the water detecting cells are sufficiently reduced that a less expensive cell construction can be used.

In accordance with the invention, a source of gas containing a component to be measured is admitted under pressure to a sample chamber of predetermined volume. After the gas has been admitted, a valve is closed to isolate the chamber from said source. The gas in the chamber is then caused to pass through a suitable detector cell, such as an electrolysis cell where water vapor is the component being measured, so that the quantity of the subject component present in the gas can be detected. Indicating means, such as a meter or recorder is associated with the cell to provide an indication of this quantity. Since the volume of the chamber and the pressure at which the gas is admitted to the chamber can be readily determined, the indicating means can be easily calibrated to read in parts of the component per unit volume.

From the foregoing it will be seen that a measuring instrument in accordance with the invention requires only relatively inexpensive forms of valves as compared to the costly flow rate controlling apparatus used heretofore.

The novel features which are considered characteristic of this invention are set forth in the appended claims. The invention itself, however, both as to its organization and method of operation, as well as other objects and advantages thereof will be best understood from the following description when read in connection with the accompanying drawings in which:

FIGURE 3 is a schematic flow and electric circuit diagram of still another modification of the detecting and measuring apparatus of FIGURE 1.

Figure 1:
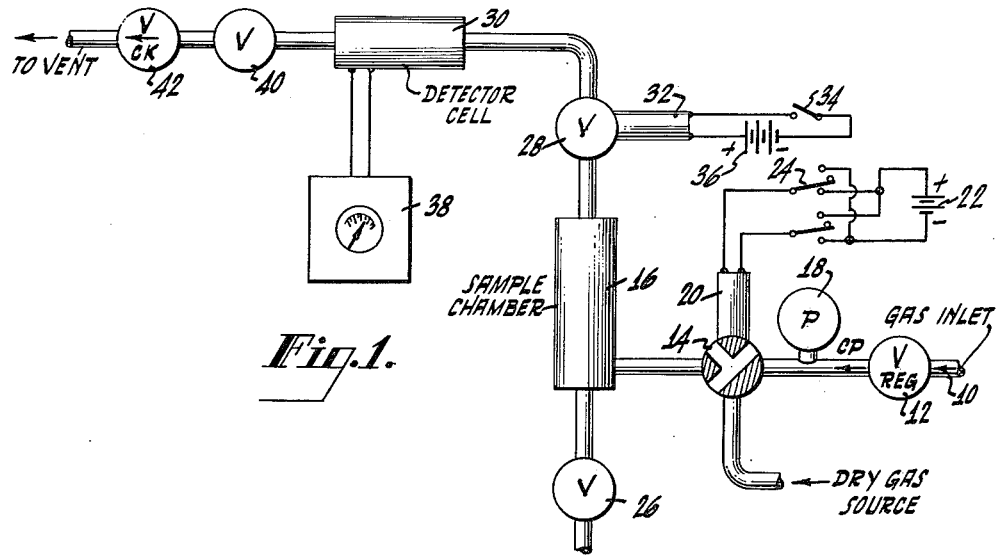
FIGURE 1 is a schematic flow and electrical circuit diagram of a detecting and measuring apparatus in accordance with the invention.

Referring now to the drawings, and particularly to FIGURE 1, a gas containing a component to be measured is conveyed through a suitable pipe line 10, an adjustable differential pressure regulating valve 12 and a solenoid operated valve 14 to a chamber 16. The valve 12 serves to maintain a constant pressure, as indicated by a gauge 18, at the inlet to the valve 14 and chamber 16.

The valve 14 may be selectively operated by a solenoid 20 associated therewith to (1) admit gas from the pipe line 10 to the chamber 16, (2) admits a dry gas from a suitable source (not shown) to the chamber 16, or (3) be closed. A power source which is shown for the sake of simplicity as a battery 22 is connected to the solenoid through a double pole triple throw switch 24. When the switch is moved to engage the lower set of contacts, the solenoid is energized to cause the valve 14 to admit gas from the pipe line 10 to the chamber 16. With the switch in the open position as shown, the valve 14 is open, and with the switch in the position where the battery voltage applied to the solenoid 20 is reversed (upper set of contacts), the valve 14 is conditioned to admit the dry gas to the chamber 16.

If desired, the chamber 16 may comprise a condensing filter of the type described in my copending application entitled "Condensing Filter," Serial No. 667,264, filed June 21, 1957, now Patent No. 2,970,669. A filter of this type is useful for separating oil or other undesirable components from the remainder of the gas stream to prevent contamination of the detector cell. The portions of the gas stream which are condensed and separated in the condensing filter are collected in a suitable reservoir at the bottom thereof and removed through a valve 26.

Gas from the chamber 16 is passed through a solenoid operated valve 28 to a detector cell 30. The valve 28 is normally open, but is adapted to be closed when a solenoid 32 associated therewith is energized. As shown in the drawings, the solenoid will be energized by the closure of a switch 34 which is connected in series with the solenoid and a power source shown as a battery 36.

The gas component detector 30 is of a type adapted to produce an indication of the amount of a particular component of the gas being passed therethrough. The amount of the component detected may be observed on a suitable indicator 38 such as a meter or recorder, or the like.

In the present case where water vapor is the component of the gas stream being measured, the detector 30 may comprise an electrolysis cell. The measurement of the water is accomplished by quantitively absorbing and electrolyzing all water present in the gas entering the measuring apparatus. The electrolysis current, which is directly related to Faraday's law to the mass rate of flow of water into the instrument, is used as an indication of water content. With a known volume of gas passed through the detector at a given pressure, the indication can be proportioned to water concentration, and can be calibrated to read directly in parts per million.

In one design that has proven practical, the absorbing material is in the form of a thin, viscous film in contact with two spirally wound platinum electrode wires on the inside of a "Teflon" tetrafluoroethylene resin tube through which the sample passes. The absorbed water is quantitively electrolyzed to hydrogen and oxygen at the electrodes by the application of a D.C. voltage. This not only provides indication of water content, but also maintains the film in an absorbent condition. The length of the element is largely governed by the fact that over 99% of the sample molecules must have a chance to diffuse to the absorbent wall during their transit time. At flow rates of about 100 cc./min. a length of approximately 2 ft. is sufficient. The diameter of the bore is governed chiefly by practical matters such as tubing flexibility and cost of manufacture. Tubing having an internal diameter of less than a millimeter has been used successfully in a large number of cells. The entire cell is housed in a section of pipe 4 inches long with an outside diameter of ½ inch. This is accomplished by coiling the 2- to 3-foot long tubing element in a helix inside the pipe and then potting it in a plastic for permanence. The electrode leads are brought out the sides through electrical insulators.

The absorbing material should be capable of removing very low concentrations of water from the sample gas stream. Furthermore, application of a D.C. potential between electrodes in contact with the material must result in current flow only by way of the process which results in electrolysis of water, and the material must be inert with respect to all other components in the sample stream.

Partially hydrated phosphorus pentoxide has proven to be an entirely satisfactory material to use in almost all applications that have been encountered.

The indicator 38 may comprise a meter including the series and shunt resistances necessary to provide different meter ranges. The indicator 38 also includes the operating current required for the electrolysis operation in the detector 30.

The gas leaving the cell 30 is passed through a valve 40 and a check valve 42 to some form of vent, such as atmosphere. The valve 40 is desirable in some instances to prevent too large a surge through the detector cell 30 when the valve 28 is opened, and the check valve 42 prevents gases from entering the cell from the venting outlet.

In the operation of the apparatus described, assume initially both solenoid operated valves are in the closed condition. The switch 24 is then moved from the position shown to the lower set of contacts to cause the valve 14 to open and pass gas from the pipe line 10 to the chamber 16. The switch 24 is then released to its open position as shown, to cause the valve 14 to close. This operation can ordinarily be completed in a second or less. The switch 34 is then opened to deenergize the solenoid 32, and thus opens the valve 28. The gas in the chamber then flows through the cell 30, the normaly open valve 40 and the check valve 42 to the venting outlet, with the rate of gas flow through the detector cell being determined by the setting of the valve 40. The desired component of the gas, such as water vapor, is detected by the detector 30, and indicated by the indicator 38. As mentioned hereinbefore, the detector cell 30 measures quantitively the amount of water vapor passing therethrough. Since the volume of the gas passing through the detector at atmospheric pressure can be calculated, from a knowledge of the sample chamber 16 volume, and the pressure under which the gas is admitted thereto, the indicator may be calibrated to read in parts per million. In situations where the chamber 16 is charged with gas from the pipe 10 at relatively infrequent intervals, the peak meter reading will be indicative of water vapor content of the gas.

Figure 2:
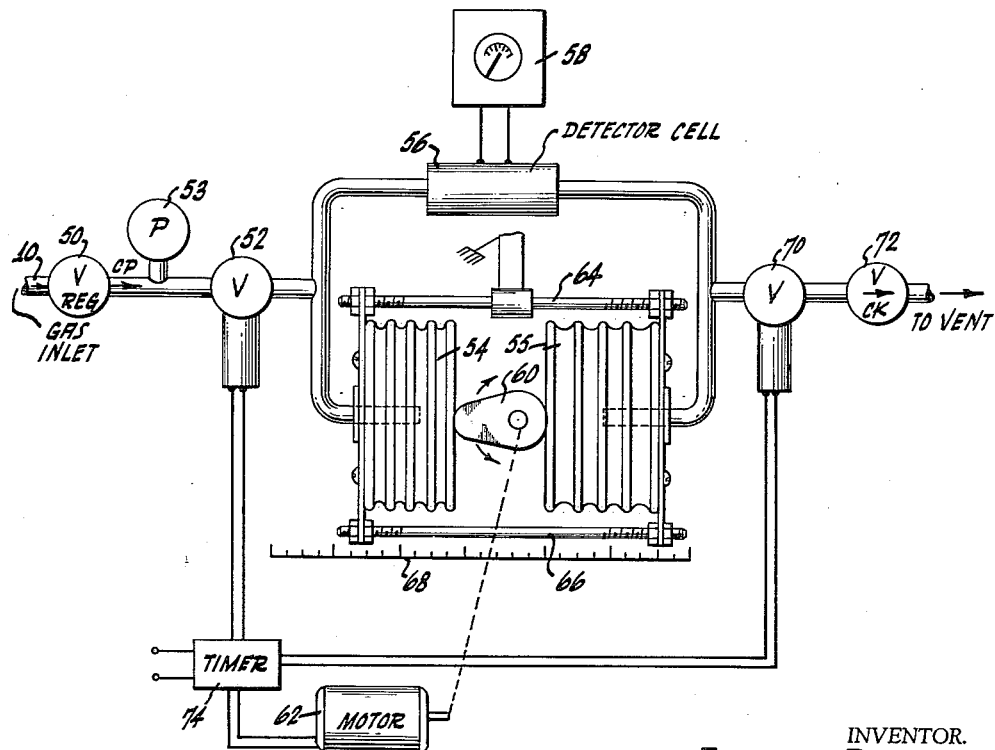
FIGURE 2 is a schematic flow and electric circuit diagram of a modification of the detecting and measuring apparatus shown in FIGURE 1.

If desired, the switches 24 and 34 may be controlled by a suitable timer as shown in FIGURES 2 and 3, so that the switching may be effected automatically and at recurring intervals.

In some cases it may be desirable to dry the system between successive charges of gas from the pipe 10. In such cases, the switch 24 is operated to the upper set of contacts to cause the valve 14 to admit dry gas to the chamber 16. The valve 28 may be simultaneously opened so that the dry gas flows continuously through the chamber 16 and the detector cell 30. The drying operation is a refinement not fundamentally required for the successful operation of the measuring apparatus of the invention.

In the embodiment of FIGURE 2, gas from the pipe line 10 is passed through an adjustable differential regulator 50 and a solenoid operated valve 52 to a sample chamber comprising primarily a set of bellows 54 and 55. The valves 50 and 52 and the pressure gauge 53 are the equivalent of the valves 12 and 14 and gauge 18 of FIGURE 1 except that the valve 52 is a two position valve. It will be noted that the drying gas feature has not been shown in the embodiments of FIGURES 2 and 3 to simplify the drawings and to more readily facilitate a complete understanding of the invention.

The bellows 54 and 55 are included in a closed loop gas recirculating path including a detector cell 56, which may be an electrolysis cell of the type described above in connection with FIGURE 1. Suitable indicating means 58 are associated with the detector cell 56 to provide an indication of the amount of water vapor or other component detected in the gas admitted to the closed loop recirculating path. In the electrolysis operation, the water is broken down into its fundamental constituents of hydrogen and oxygen. It may be desirable in some instances to employ a substance for absorbing one of these elements, such as, for example, the oxygen component to prevent a regenerative action (recombination of the hydrogen and oxygen) in the presence of the platinum catalyst which comprises the electrodes of the electrolysis cell.

The bellows 54 and 55 are operated by a cam 60 which is driven by a motor 62. As the cam rotates, the bellows 54 is compressed, as the bellows 55 is allowed to be expanded, thereby driving the gas in one direction through the detector cell 56. On the alternate half cycle, the bellows 54 is allowed to be expanded as the bellows 55 is compressed, thereby driving the gas in the opposite direction through the detector cell 56.

It will be noted that the position of the outer ends of both bellows are adjustable to fixed positions along the guide frames 64 and 66 to provide a variable control of the volume of the closed loop. A suitable scale 68 provides a direct reading from which the volume of the bellows for any given setting thereof may be readily determined. The disclosed form of volume controlling structure is illustrative of a means for adjusting the indicator scale range as will be hereinafter described. Any suitable volume adjusting mechanism may be used without departing from the scope of the invention.

An outlet port for the closed loop gas recirculating path is provided through the solenoid operated valve 70 and the check valve 72 to a venting outlet. The solenoid portions of the valves 52 and 70 are connected to a timer 74. The timer 74 controls the application of power to the solenoids to cause their actuation in the desired sequence.

In the operation of the system shown in FIGURE 2, the valves 52 and 70 are normally closed. Initially, the valve 52 is opened by application of energizing current to the solenoid associated therewith. This permits gas to enter the closed loop including the sample chamber formed by the bellows 54 and 55. The valve 52 is then closed. The motor 62 is then energized to rotate the cam 60 which operates the bellows. This causes the gas to be recirculated back and forth through the detector cell 56. An indication of the quantity of the component to be detected, such as water vapor, may then be observed on the indicating means 58. After a suitable period of time wherein the component of the gas to be measured has been removed by the detector cell 56, the solenoid operated valve 70 is opened to permit the gas in the closed loop and the bellows 54 and 55 to escape to the venting outlet.

The apparatus shown in FIGURES 2 and 3 provides particular advantages not afforded by apparatus heretofore known. It will be noted that a single charge of gas admitted to the closed loop including the bellows 54 and 55 is recirculated through the detector cell 56 many times. Thus, a less sensitive and hence less expensive detector cell may be used to obtain the desired indication. For example, in the case of an electrolysis cell, a much shorter section may be used. By passing the gas back and forth over the shorter section, substantially all of the water vapor will be absorbed and electrolyzed to provide the desired indication. In other words, the efficiency of a given electrolysis cell is effectively increased by increasing its exposure to the gas.

For measuring greatly different concentrations of a component of a gas it is desirable to provide a range control to expand the indicator scale for small concentrations and compress the scale for large concentrations. In addition to the conventional methods of adjusting the shunt and series resistances in the metering circuit, range control is provided in the apparatus described by adjustment of pressure or volume or both. For low concentrations of the component to be measured, the pressure or volume or both may be increased to expand the indicator scale. Conversely, for high concentrations of the component, such as water vapor, the volume or pressure or both may be decreased to contact the indicator scale.

A particular advantage is provided in the apparatus described in that the range of the instrument is extended to measure extremely small quantities of a component in a gas by an increase in the pressure of the gas admitted to the closed loop. In the case of the electrolysis cell, if the pressure is increased, with a given volume chamber more gas is admitted and hence quantitively more water vapor. This effectively provides a greater water concentration per unit volume which is passed over the detector cell. Thus, the cell is able to detect the vapor in quantities which would not be accurately measurable with the gas at atmospheric pressure.

Although the recirculation of the gas through the detector cell 56 has been effected in the structure of FIG. 2 by means of a bellows, other forms of pumps can be used, such as a simple diaphragm pump, or a conventional unidirectional pump 80 as shown in FIG. 3. In cases where the pump itself does not provide a sufficiently large sample chamber, a separate chamber 82 is provided. The measuring apparatus of FIGURE 3 is otherwise similar to that of FIGURE 2, and like reference numerals are used to designate similar elements of structure.

Having described my invention, what is claimed is:

1. A measuring apparatus comprising in combination, a detector cell for measuring a component of a gas passed therethrough, pump means, a closed loop gas recirculating path including said detector cell and said pump means, said closed loop gas recirculating path having an inlet port connected to a first normally closed valve and an outlet port connected to a second normally closed valve, said first valve adapted to be connected to a source of gas under a first pressure and adjustable to an open condition to admit said gas at said first pressure to said closed loop recirculating path, said pump means adapted to recirculate gas admitted to said path through said detector cell, said second valve adjustable to an open condition to exhaust gas from said closed loop recirculating path.

2. A measuring apparatus of the type defined in claim 1 wherein said pump means is operative to recirculate said gas back and forth through said detector cell.

3. A measure apparatus of the type defined in claim 1 wherein said closed loop recirculating path includes means providing a sample chamber of variable volume.

4. A measuring apparatus of the type defined in claim 1 wherein said pump means is of the type for continuously recirculating said gas in one direction around said closed loop recirculating path.

5. A measuring apparatus as defined in claim 1 wherein the component of said gas to be detected and measured is water vapor and wherein said detector cell comprises an electrolysis cell of the type for absorbing and electrolyzing water vapor present in a gas passed therethrough and wherein said pump means comprises a bellows.

6. A water vapor detection system for extending the sensitivity of water vapor detection cells comprising, an adjustable differential regulator valve having an inlet port and an outlet port and adapted to maintain a constant pressure at the outlet port which is above atmospheric pressure, a water vapor detector cell of the type which absorbs and electrolyzes minute quantities of water vapor present in a gas passed therethrough, pump means, a closed loop gas recirculating path including said detector cell and said pump means, a first valve connecting the outlet port of said adjustable differential regulator with said closed loop gas recirculating path, means including a second valve for connecting said closed loop gas recirculating path to a venting outlet which is maintained at a pressure lower than that in the outlet port of said adjustable differential regulator, said first valve adapted to be opened while said second valve is closed to admit gas to said closed loop recirculating path at said pressure higher than atmospheric pressure so that the amount of water vapor per unit of volume is increased, said first valve adapted to be closed after the gas has been admitted to said closed loop recirculating path, and said pump means is operable to recirculate said gas in said path through said detection cell, and indicating means associated with said detection cell to provide an indication of the water content of a gas admitted to said closed loop recirculating path, said second valve adapted to be opened to permit the gas in said closed loop recirculating path to be exhausted through said venting outlet.

References Cited in the file of this patent
UNITED STATES PATENTS

| | | |
|---|---|---|
| 2,540,674 | Jacobson | Feb. 6, 1951 |
| 2,809,928 | Dudley | Oct. 15, 1957 |
| 2,830,945 | Keidel | Apr. 15, 1958 |
| 3,006,836 | Cole | Oct. 31, 1961 |